US009866617B2

(12) United States Patent
Skog et al.

(10) Patent No.: US 9,866,617 B2
(45) Date of Patent: *Jan. 9, 2018

(54) SYSTEM AND METHOD FOR ADAPTING INFORMATION CONTENT ACCORDING TO THE CAPABILITY OF THE ACCESS BEARER

(71) Applicant: Optis Wireless Technology, LLC, Plano, TX (US)

(72) Inventors: Robert Bengt Skog, Hässelby (SE); Staffan Pehrson, Danderyd (SE)

(73) Assignee: OPTIS WIRELESS TECHNOLOGY, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/133,747

(22) Filed: Apr. 20, 2016

(65) Prior Publication Data
US 2016/0234289 A1 Aug. 11, 2016

Related U.S. Application Data

(63) Continuation of application No. 14/507,073, filed on Oct. 6, 2014, now Pat. No. 9,344,481, which is a (Continued)

(30) Foreign Application Priority Data

Jul. 7, 2000 (SE) ...................................... 0002572

(51) Int. Cl.
G06F 15/16 (2006.01)
H04L 29/08 (2006.01)
(Continued)

(52) U.S. Cl.
CPC ........ *H04L 67/04* (2013.01); *G06F 17/30905* (2013.01); *H04L 29/06* (2013.01);
(Continued)

(58) Field of Classification Search
CPC ......... H04L 67/04; H04L 29/06; H04L 67/02; H04L 67/06; H04L 41/28;
(Continued)

(56) References Cited

U.S. PATENT DOCUMENTS 5,638,412 A * 6/1997 Blakeney, II .......... H04B 7/264
370/341
5,818,871 A 10/1998 Blakeney, II et al.
(Continued)

FOREIGN PATENT DOCUMENTS

JP H10150470 A 6/1998
JP H11149448 A 6/1999
(Continued)

OTHER PUBLICATIONS

Extended European Search Report dated Nov. 10, 2019, 8 pgs.
International Search Report for PCT/SE01/001564 dated Oct. 30, 2001, 2 pgs.

Primary Examiner — Thu Ha Nguyen

(57) ABSTRACT

A communication system is adapted to provide access to application information on an application server utilizing a specific one of multiple radio access types. Access is provided via an access network using an access bearer. The capability of the specifically requested access bearer is sent to the application server to tailor the application information content according to the capability of the specific access bearer. The information content is then transmitted to the requesting device.

20 Claims, 3 Drawing Sheets

Related U.S. Application Data continuation of application No. 10/337,198, filed on Jan. 6, 2003, now Pat. No. 8,856,358, which is a continuation of application No. PCT/SE01/01564, filed on Jul. 6, 2001.

(51) Int. Cl.

| | | |
|---|---|---|
| *G06F 17/30* | (2006.01) | |
| *H04L 29/06* | (2006.01) | |
| *H04W 4/18* | (2009.01) | |
| *H04W 8/18* | (2009.01) | |
| *H04W 80/00* | (2009.01) | |
| *H04L 12/24* | (2006.01) | |
| *H04W 80/12* | (2009.01) | |

(52) U.S. Cl.
CPC .............. *H04L 41/28* (2013.01); *H04L 67/02* (2013.01); *H04L 67/06* (2013.01); *H04W 4/18* (2013.01); *H04W 8/183* (2013.01); *H04W 80/00* (2013.01); *H04W 80/12* (2013.01); *H04L 69/329* (2013.01)

(58) Field of Classification Search
CPC ... G06F 17/30905; H04W 4/18; H04W 8/183; H04W 80/00; H04W 80/12; H04W 69/329
USPC ................. 709/218, 219, 217; 370/340, 405
See application file for complete search history.

(56) References Cited

U.S. PATENT DOCUMENTS

| | | | |
|---|---|---|---|
| 5,905,872 | A | 5/1999 | DeSimone et al. |
| 6,205,143 | B1 | 3/2001 | Lemieux |
| 6,336,137 | B1 | 1/2002 | Lee et al. |
| 6,343,318 | B1 | 1/2002 | Hawkins et al. |
| 6,415,329 | B1 | 7/2002 | Gelman et al. |
| 6,430,624 | B1 | 8/2002 | Jamtgaard et al. |
| 6,850,766 | B2* | 2/2005 | Lau .................... G01C 21/3608 342/357.31 |
| 6,970,183 | B1 | 11/2005 | Monroe |
| 7,010,294 | B1* | 3/2006 | Pyotsia ................. G05B 19/042 340/3.1 |
| 7,016,360 | B1 | 3/2006 | Dong |
| 7,054,945 | B2 | 5/2006 | Hurtta et al. |
| 7,089,031 | B1 | 8/2006 | Pedersen et al. |
| 7,093,286 | B1 | 8/2006 | King |
| 7,103,018 | B1* | 9/2006 | Hansen ............. H04M 1/72561 370/328 |
| 7,106,718 | B2 | 9/2006 | Oyama et al. |
| 7,114,007 | B2* | 9/2006 | Sasaki .................... H04L 29/06 709/203 |
| 7,155,517 | B1 | 12/2006 | Koponen et al. |
| 7,193,995 | B1 | 3/2007 | Solala |
| 7,206,806 | B2* | 4/2007 | Pineau .............. G06F 17/30905 348/14.02 |
| 7,230,921 | B2 | 6/2007 | Eriksson et al. |
| 7,260,080 | B2 | 8/2007 | Suumäki et al. |
| 7,260,409 | B2 | 8/2007 | Hanson |
| 7,483,686 | B2 | 1/2009 | Sorrells et al. |
| 7,532,613 | B1 | 5/2009 | Sen et al. |
| 7,570,943 | B2* | 8/2009 | Sorvari ............. G06F 17/30884 379/88.17 |
| 7,657,741 | B2 | 2/2010 | Adams et al. |
| 7,725,711 | B2 | 5/2010 | Brown et al. |
| 7,822,410 | B2 | 10/2010 | Coppinger et al. |
| 8,032,409 | B1 | 10/2011 | Mikurak |
| 8,065,357 | B2 | 11/2011 | Cocotis et al. |
| 8,145,222 | B2* | 3/2012 | Wormald ................ H04W 4/18 370/351 |
| 8,645,456 | B2 | 2/2014 | Li et al. |
| 9,203,912 | B2 | 12/2015 | Krishnaswamy et al. |
| 2002/0059457 | A1 | 5/2002 | Ballard et al. |
| 2002/0067909 | A1* | 6/2002 | Iivonen .................. H04N 7/165 386/275 |
| 2002/0082015 | A1 | 6/2002 | Wu |
| 2002/0089993 | A1 | 7/2002 | Suumaki et al. |
| 2002/0109706 | A1 | 8/2002 | Lincke et al. |
| 2002/0120719 | A1 | 8/2002 | Lee et al. |
| 2002/0141393 | A1* | 10/2002 | Eriksson ............... H04W 80/06 370/352 |
| 2002/0174147 | A1 | 11/2002 | Wang et al. |
| 2002/0187775 | A1 | 12/2002 | Corrigan et al. |
| 2003/0035409 | A1* | 2/2003 | Wang ..................... H04L 29/06 370/349 |
| 2003/0093406 | A1 | 5/2003 | Zellner et al. |
| 2003/0131055 | A1 | 7/2003 | Yashchin et al. |
| 2003/0211858 | A1 | 11/2003 | Coan et al. |
| 2003/0223454 | A1 | 12/2003 | Abraham et al. |
| 2003/0229900 | A1 | 12/2003 | Reisman |
| 2005/0060411 | A1 | 3/2005 | Coulombe et al. |
| 2005/0125547 | A1* | 6/2005 | Ahonen ................ H04L 29/06 709/228 |
| 2005/0232284 | A1 | 10/2005 | Karaoguz et al. |
| 2005/0283533 | A1 | 12/2005 | Schluter et al. |
| 2006/0168095 | A1 | 7/2006 | Sharma et al. |
| 2006/0168275 | A1* | 7/2006 | Lin ....................... H04W 92/02 709/230 |
| 2007/0022180 | A1* | 1/2007 | Cocotis ................. H04L 29/06 709/217 |
| 2007/0206573 | A1 | 9/2007 | Silver |
| 2007/0243872 | A1* | 10/2007 | Gallagher ........... H04W 76/022 455/436 |
| 2007/0281687 | A1 | 12/2007 | Jiang |
| 2007/0283048 | A1 | 12/2007 | Theimer et al. |
| 2007/0293216 | A1 | 12/2007 | Jiang |
| 2008/0217551 | A1* | 9/2008 | Zhang ....................... G01T 7/00 250/390.03 |
| 2009/0100185 | A1* | 4/2009 | Sheha ............... H04L 29/12066 709/229 |
| 2009/0125321 | A1* | 5/2009 | Charlebois ............. G06Q 30/02 705/346 |
| 2009/0313318 | A1 | 12/2009 | Dye et al. |
| 2011/0078375 | A1* | 3/2011 | Shepherd ........... G06F 12/0866 711/115 |
| 2011/0271319 | A1* | 11/2011 | Venable, Sr. ........... H04L 41/12 726/1 |
| 2011/0286387 | A1 | 11/2011 | Sane et al. |
| 2012/0069750 | A1 | 3/2012 | Xing et al. |
| 2013/0196698 | A1 | 8/2013 | Lee et al. |
| 2014/0082068 | A1 | 3/2014 | Lv et al. |
| 2014/0096667 | A1 | 4/2014 | Chapman et al. |
| 2014/0362807 | A1 | 12/2014 | Bhatnagar et al. |
| 2015/0012931 | A1 | 1/2015 | Ortiz et al. |
| 2015/0181640 | A1 | 6/2015 | Kwong et al. |
| 2015/0304939 | A1 | 10/2015 | Liu et al. |
| 2015/0327053 | A1 | 11/2015 | Zhou et al. |

FOREIGN PATENT DOCUMENTS

| | | |
|---|---|---|
| JP | H11288403 A | 10/1999 |
| JP | 2000122951 A | 4/2000 |
| WO | 9535002 A1 | 12/1995 |
| WO | 9736429 A2 | 10/1997 |
| WO | 9819438 A1 | 5/1998 |
| WO | 9956431 A2 | 11/1999 |
| WO | 0135689 A1 | 5/2001 |
| WO | 0205581 A1 | 1/2002 |

\* cited by examiner

SYSTEM AND METHOD FOR ADAPTING INFORMATION CONTENT ACCORDING TO THE CAPABILITY OF THE ACCESS BEARER

CLAIM OF PRIORITY

This application is a continuation of U.S. application Ser. No. 14/507,073, filed Oct. 6, 2014, which is a continuation of U.S. application Ser. No. 10/337,198, filed Jan. 6, 2003, now U.S. Pat. No. 8,856,358, which is a continuation of International Application No. PCT/SE01/01564 filed Jul. 6, 2001, which claims priority to Swedish Application No. 002572-6, filed Jul. 7, 2000, the disclosures of which are fully incorporated herein by reference.

BACKGROUND

Technical Field of the Invention

The present invention relates in general to a communication system and in particular to a wireless communication system. More particularly, the present invention relates to a communication system with more than one type of radio access.

Description of the Related Art

In the mobile Internet world, users may have more than one type of radio access available to connect to an application server. Radio accesses (access bearers) to applications on the Internet that may be available to a user include: Short Message Service (SMS), Unstructured Supplemental Service Data (USSD), Circuit Switched Data (CSD), General Bluetooth™ Packet Radio Services (GPRS), Universal Mobile Telephone System (UMTS) and Bluetooth™ (a short range, high frequency communication protocol). Each of these access bearers has different attributes or capabilities including transmission speed (bandwidth).

Wireless Application Protocol (WAP) is a technology that enables wireless access to Internet applications from a wireless terminal (cell phone, wireless modem, etc.) The WAP Forum, a nonprofit organization formed for administering the WAP Specification process, has defined a WAP architecture for pulling information from the Internet (Internet browsing) and pushing (application initiated) information (sending news messages, mail notification, etc.) to a user.

The WAP Forum, in its Wireless Application Environment (WAE), has adopted an application framework for access to the Internet by wireless terminals such as mobile phones, pagers and Personal Digital Assistants (PDAs). This specification closely follows the World Wide Web (WWW) model. All content is specified in formats that are similar to standard Internet formats. Content may be transported using standard protocols in the WWW domain and an optimized HTTP-like protocol in the wireless domain such as the Wireless Session Protocol (WSP), a WAP communication protocol.

A mobile phone may initiate a data call in the GSM network, in a packet switched data network like the General Packet Radio Services (GPRS), or the Universal Mobile Telephone System (UMTS) which is the standard for the next generation mobile telephone system in Europe. There is also the possibility to use short-range radio access technology like Bluetooth™.

FIG. 1 illustrates a communication system in which a wireless terminal may establish connection to an application server via a WAP Gateway and an IP network utilizing one of many access bearers (e.g. Bluetooth™, GSM, GPRS or UMTS). Mobile phone 102 can connect to an Application Server 116 using Wireless Application Protocol (WAP) Gateway 114 via one of several types of access technology.

In FIG. 1, Application Server 116 is connected to WAP Gateway 114 via a LAN (not shown) or via an Internet Protocol (IP) network (not shown) and WAP Gateway 114 may in turn be connected to mobile phone 102 via IP network 112. The protocol used by WAP Gateway 114 to reach applications residing in Application Server 116 may be accomplished by using Hypertext Transfer Protocol (HTTP), a well-known and established standard protocol for transporting hypertext documents around the Internet.

Application Server 116 is not aware of the bearer type by which the mobile phone 102 gained access. However, if the bearer type that is used is not according to preferred access means, there could be reduced capability of the connection. For example, if mobile phone 102 was connected using an SMS bearer connection and a WAP page is selected that was designed for CSD (9.6 Kbps), the downloading time for the page may be too long and inconvenient for the end user.

FIG. 2 depicts a high-level block diagram of a GSM and UMTS network with typical coverage for radio accesses in a mobile network. In a Public Land Mobile Network (PLMN) different access types co-exist and will typically be unevenly deployed in the network at any given time. An operator that has GSM coverage and is in the process of introducing GPRS will start introducing GPRS in selected areas first, such as cities. The same procedure will likely be followed when introducing a next generation mobile system, e.g., UMTS. The reason for gradually introducing access bearers into a PLMN that have higher capacity is generally related to cost because of the necessary investment in infrastructure.

Mobile phones may move around in the PLMN area and, depending on the radio access availability, be able to use different access bearers (for simplicity, only Bluetooth™ is illustrated here). Another aspect regarding the choice of bearer, except for different downloading times, is related to the different costs for using different bearers, i.e., it may be cheaper to implement one access bearer before another bearer.

A drawback with communication systems used today is that the information about the bearer may not be known to the application, for example, when using WAP. One object of the present invention is to increase and optimize a user's accessibility of application information, including reducing download time for the user. Another object of the present invention is to provide a communication system that identifies the access bearer capability to the application.

SUMMARY

A mobile phone may use different bearers, e.g. GPRS, Circuit Switched Data (CSD), SMS/USSD (via GSM), etc., and the same bearer may use different transmission speeds depending on available channels at the moment access is requested. In order for the application on the server to know the capability of the bearer that is used in the radio access, that capability must be recognized and forwarded to the application server.

Information regarding the capability (characteristics, parameters) of a particular access bearer is attached to a request message and sent to the application server. The present invention makes it possible for an application to tailor the accessed information content according to the capability of the bearer that is utilized for the specific access.

In order to provide the user with a valuable service, the application has to adapt to the capability of the bearer that is used for the access. Adaptation can mean that the information formatting is adjusted to the bearer capabilities or even that the information itself is adjusted. An example of the latter case is an application that only sends a summary of world news to a mobile phone rather than extensive articles.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION

In the following description, for purposes of explanation and not limitation, specific details are set forth, such as particular architectures, interfaces, circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logic code (e.g., hardware, software, firmware, etc.), etc., are omitted so as not to obscure the description of the present invention with unnecessary detail.

Figure 1:
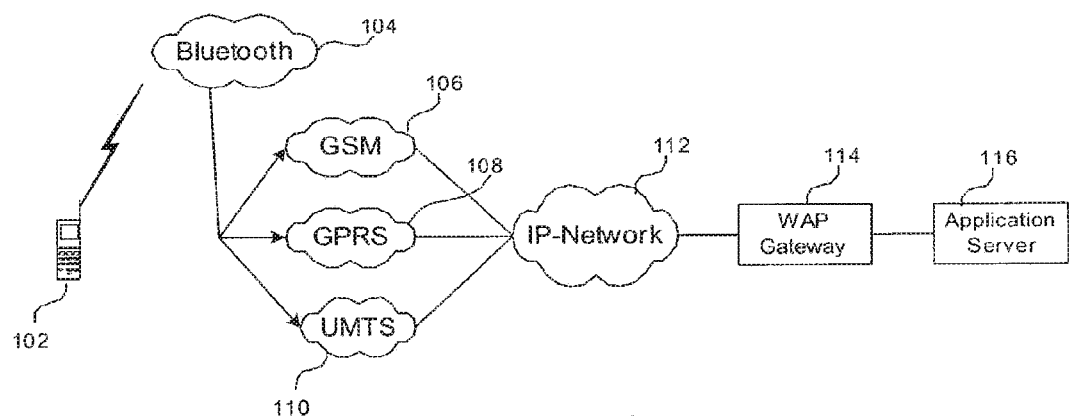
FIG. 1 illustrates a high-level block diagram of a telecommunications system.
Figure 2:
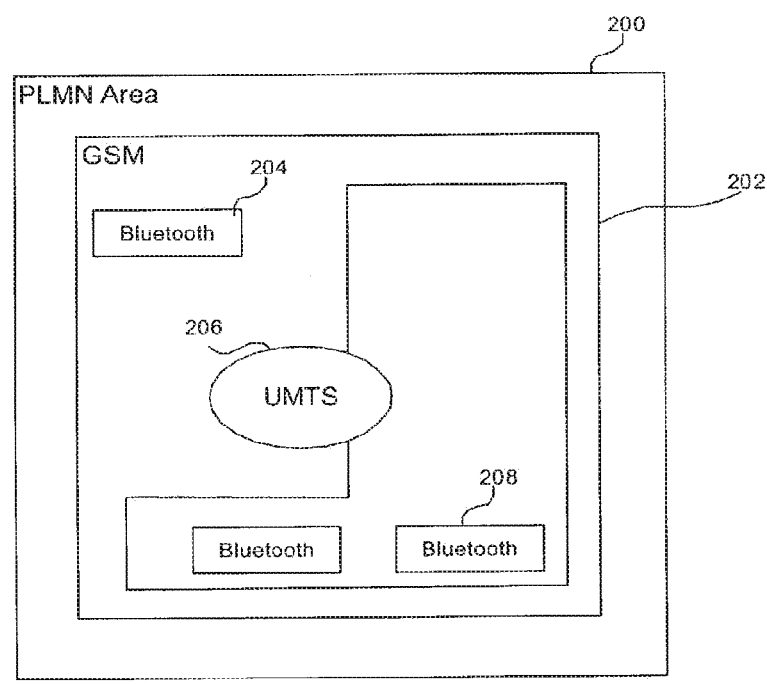
FIG. 2 depicts a high-level block diagram of GSM and UMTS coverage for Bluetooth™ radio access in a mobile network.
Figure 3:
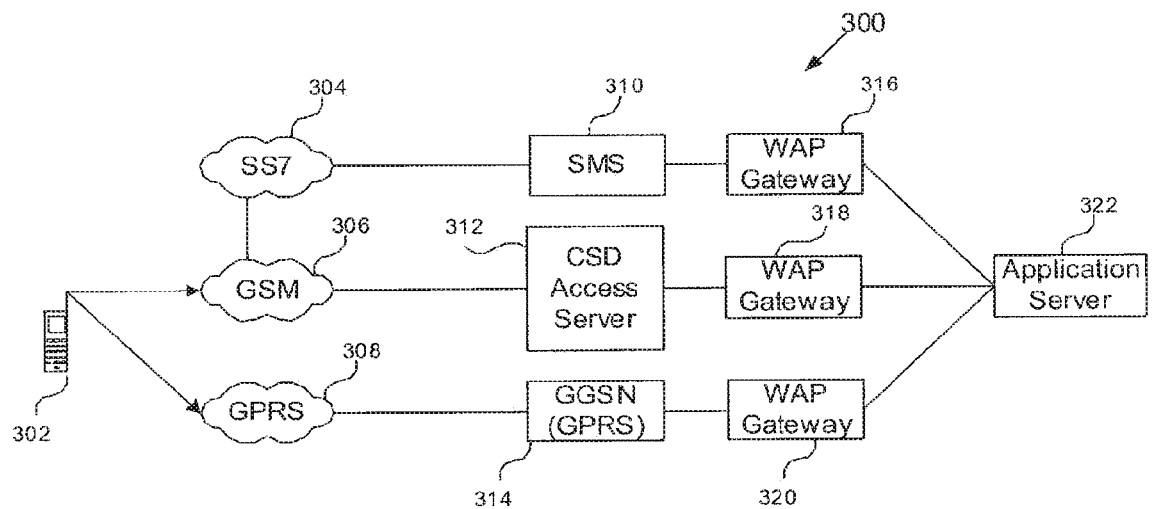
FIG. 3 illustrates a high-level block diagram of a telecommunications system according to a preferred embodiment of the present invention.

A preferred embodiment of the present invention and its advantages are best understood by referring to FIGS. 1-5 of the drawings. With reference now to the figures, FIG. 3 illustrates a high-level block diagram of a telecommunications system according to a preferred embodiment of the present invention. The embodiment shown in FIG. 3 discloses three examples of access bearers, each being provided with a WAP Gateway especially designed for the capability for the respective access bearer. In FIG. 3, Short Message Service (SMS) server 310 is connected to mobile phone 302 via Signaling System No. 7 (SS7) 304, a protocol for signaling, and GSM network 306 in accordance with established technique. CSD Access Server 312 and Gateway GPRS Support Node (GGSN) server 314 are connected to mobile phone 302 via GSM network 306 and GPRS network 308, respectively, also in accordance with established technique. The number of WAP Gateways is limited to three for the sake of clarity and simplification of disclosure. Generally, the number of WAP Gateways that are utilized equals the number of different active access bearers.

The capability of an access bearer includes a parameter regarding the transmission speed used by that bearer. Other parameters that are related to the transmission may also be included in the capability information.

The term "terminal" will be used hereinafter to describe a device that is adapted to initiate an information request to an application server and to receive the requested information. In the description of a preferred embodiment the terminal is exemplified by mobile phone 302. However, any device provided with means for generating such an information request may be used as a terminal such as a laptop computer, a mobile phone and any hand-held device that is adapted for wirelessly connecting to an application server.

In the present invention, there is one gateway assigned to each type of access bearer. By having one gateway per access bearer, the different gateways would know the capability of the access bearer it is serving. However, if the designated access bearer is capable of using different speeds, the actual transmission speed may not be known since the speed may be decided at the terminal.

Mobile phone 302 may initiate a request (WAP or HTTP request) to the application server via a particular access bearer and the gateway allocated to the access bearer. When the request passes through the gateway, the capability of the access bearer may be attached to the request. This can be done, for example, by using a cookie in the header of the request. If the request was a WAP request, prior to appending the capability of the access bearer, the request is transformed into an HTTP request. Then, the WAP Gateway appends the capability of the access bearer in an HTTP header of the HTTP request.

Example of a HTTP Header:

Cookie: Access-Bearer-Type="(bearer)";

where "bearer" is the type of access, i.e., SMS, USSD, CSD-9.6, CSD-14.4, GPRS, UMTS or Bluetooth™. The HTTP request is then sent to the Application Server.

The requested application server extracts the Access-Bearer-Type cookie from the HTTP header according to well-known HTTP programming technique. The requested application may then be tailored in response to the capability information of the access bearer to achieve an optimized transmission to the terminal requesting the application information.

Figure 4:
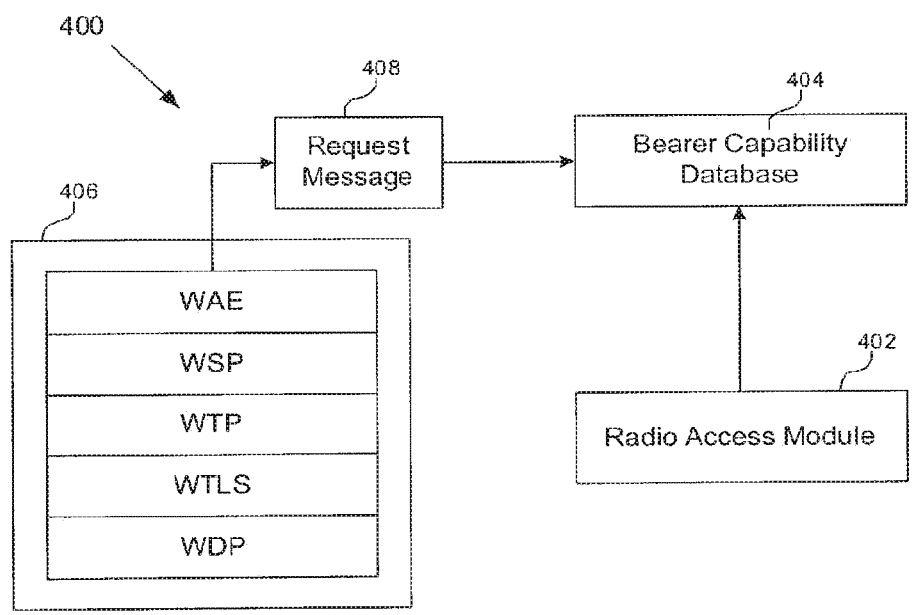
FIG. 4 depicts a block diagram of a wireless terminal in accordance with a preferred embodiment of the present invention.

FIG. 4 depicts a block diagram of a wireless terminal in accordance with a preferred embodiment of the present invention. Terminal 400 comprises Radio Access Module (RAM) 402, Bearer Capability Database (BCD) 404 and WAP User Agent 406. If terminal 400 is capable of using HTTP directly, the WAP gateway (not shown) may be replaced with an HTTP proxy server.

Radio Access Module 402 is able to detect the type of access bearer that terminal 400 uses based upon frequencies and number of time slots in the radio link. This access bearer type information is continuously interpreted in RAM 402. By interpreting frequencies, number of time slots and type of radio channel used RAM 402 calculates transmission speed and continuously writes the transmission speed into memory storage (not shown) in BCD 404. At each request, the current necessary information in BCD 404 is appended to request message 408. If terminal 400 is already connected to an application server (not shown) and a change in the bearer access capabilities occurs, terminal 400 is informed and RAM 402 interprets the change in capabilities and writes it continuously into the BCD 404. This new information is then appended into the next WAP request (or HTTP request).

WAP User Agent 406 comprises a number of protocol layers. An alternative to a WAP user agent would be to directly use an HTTP client in the terminal. The different layers in WAP User Agent 406 are: Wireless Application Environment (WAE), Wireless Session Protocol (WSP), Wireless Transaction Protocol (WTP), Wireless Transport Layer Security (WTLS) and Wireless Datagram Protocol. (WDP). When an application request (information request) is initiated WAP User Agent 406 (may also be an HTTP client) is arranged to make a WAP request (or HTTP request) to an application on the application server via the WAP protocol (or HTTP protocol) and the relevant capability of the access bearer is determined identified in Bearer Capability Database 404. The capability retrieved from BCD 404 is then appended to the WAP request (HTTP request) in a WAP header (or HTTP header). A WAP header will have the same look as the previously described HTTP header, but can be binary encoded.

When the application server has received information concerning the capability of the access bearer being used by a terminal, the requested application is adapted to tailor the application information to be transmitted to the accessing user. This may be performed in many different ways, e.g. the information formatting is adjusted to the bearer capabilities or even that the information itself is adjusted. An example of the latter case is an application that only sends a summary of world news to a mobile phone rather than extensive articles. Another example of adjusting the information is to filter out images from a newspaper article and only send the text information.

Figure 5:
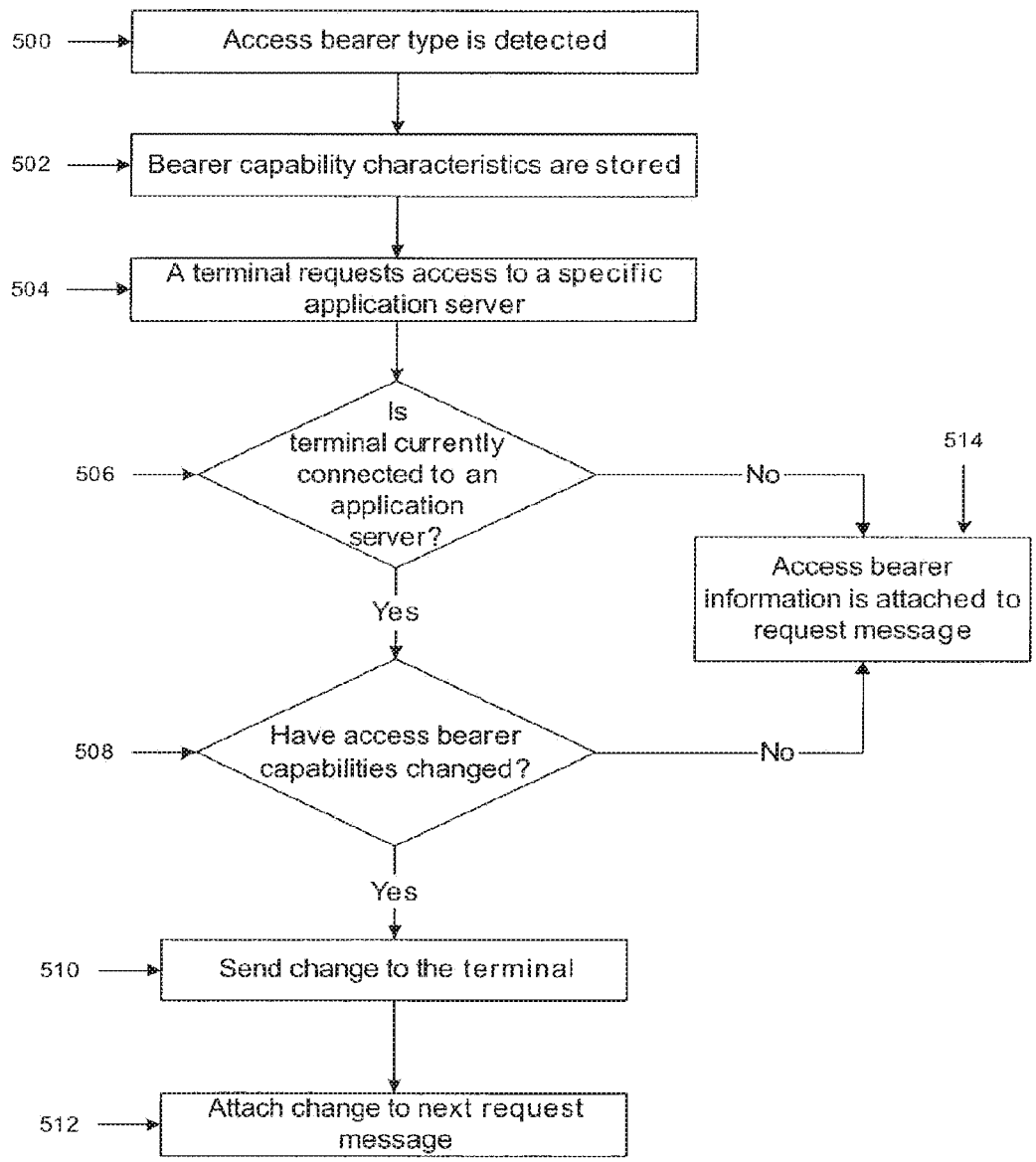
FIG. 5 illustrates a high-level flow diagram for accessing application information in an application server in accordance with a preferred embodiment of the present invention.

FIG. 5 illustrates a high-level flow diagram of a method for accessing application information in an application server in accordance with a preferred embodiment of the present invention. The process begins when a specific access bearer is detected (step 500). The capabilities of the access bearer, including bandwidth (transmission speed) are stored in memory (capability information may be stored in terminal memory)(step 502). When a terminal requests a specific application utilizing the access bearer, the information stored in memory is retrieved (step 504).

A determination is made of whether the terminal is currently connected to an application server containing the requested application (step 506). If the terminal is not currently connected, the access bearer information is attached to the request message and the message is transmitted to the application server containing the requested application (step 514). If the terminal is currently connected to an application server containing the requested application, a determination is made whether the bearer capabilities have changed (step 508). If there is no change, the access bearer information is attached to the request message and the message is transmitted to the application server (step 514).

If there is a change in the characteristics of the access bearer, the change is stored in a memory. In the case where the terminal attaches the access bearer information (see FIG. 4), the change is sent to the terminal and stored in a database in the terminal (step 510). The change may then be attached to the next request message depending on the timing of the next request (step 512).

The present invention monitors the different access bearers that are connected to an application server. Capabilities (characteristics) of the individual access bearers are detected and stored in a database as the capabilities change. A wireless terminal may make a request for access to an application residing on an application server that is accessible by the aforementioned access bearers. The present invention retrieves the current bearer information from the database and, after any necessary conversion, attaches the information to a request message. The message is sent to the respective application server and the application utilizes the attached information to tailor the response for subsequent transmittal to the terminal.

Those skilled in the art should readily appreciate that the present invention is capable of numerous rearrangements, modifications, and substitutions without departing from the spirit and scope of the present invention as set forth and defined by the following claims.

What is claimed is:

1. A terminal in a wireless communication system, wherein the terminal is adapted to be wirelessly connected to at least one access device, each of said at least one access device arranged to provide wireless access over a type of access bearer, the terminal comprising a controller and memory, the controller, working with the memory, being configured to:
   initiate an information request to be sent to an application server;
   store, in the memory, information about a bearer capability of an access bearer used for conveying communication between the terminal and the at least one access device;
   retrieve, from the memory, information about the bearer capability of the access bearer;
   identify a relevant bearer capability based on the retrieved information;
   attach information representative of the relevant bearer capability of the access bearer to a header of the information request; and
   send the information request, with the header, to the application server via the access bearer.

2. A terminal in accordance with claim 1, wherein the controller, working with the memory, is further configured to receive requested information from the application server in response to the information request.

3. A terminal in accordance with claim 2, wherein the received requested information is tailored depending on the information representative of the relevant bearer capability of the access bearer used for conveying communication between the terminal and the at least one access device.

4. A terminal in accordance with claim 1, wherein attaching the information representative of the relevant bearer capability of the access bearer to a header of the information request comprises one of attaching the information representative of the relevant bearer capability to a header of a WAP request or attaching the information representative of the relevant bearer capability to a header of an HTTP request.

5. A terminal in accordance with claim 1, wherein the controller, working with the memory, is further configured to calculate transmission speed used by the access bearer used for conveying the information request, and write the calculated used transmission speed into the stored information.

6. A terminal in accordance with claim 1, wherein the controller, working with the memory, is further configured to:
   interpret a change in the bearer capability; and
   write the interpreted change into the stored information when the terminal is connected to the application server.

7. A terminal in accordance with claim 1, wherein the identification of the relevant bearer capability from the retrieved information comprises detection of a type of bearer that the terminal uses based on the retrieved information, and the attachment of the information representative of the relevant bearer capability of the access bearer to the header of the information request comprises attachment of information representative of the type of bearer to the header of the information request.

8. A method of operating a terminal in a wireless communication system, wherein the terminal is adapted to be wirelessly connected to at least one access device, each of said at least one access device arranged to provide wireless access over a type of access bearer, the terminal comprising a controller and memory, the method comprising:
 initiating, by the controller, an information request to be sent to an application server;
 storing, in the memory, information about a bearer capability of an access bearer used for conveying communication between the terminal and the at least one access device;
 retrieving, from the memory, information about the bearer capability of the access bearer;
 identifying, by the controller, a relevant bearer capability from the retrieved information;
 attaching, by the controller, information representative of the relevant bearer capability of the access bearer to a header of the information request; and
 sending the information request, with the header, to the application server via the access bearer.

9. A method in accordance with claim 8, further comprising receiving requested information from the application server in response to the information request.

10. A method in accordance with claim 9, wherein the received requested information is tailored depending on the information representative of the relevant bearer capability of the access bearer used for conveying communication between the terminal and the at least one access device.

11. A method in accordance with claim 8, wherein the information request is one of a WAP request or an HTTP request.

12. A method in accordance with claim 8, further comprising calculating transmission speed used by the access bearer used for conveying the information request, and writing the calculated used transmission speed into the stored information.

13. A method in accordance with claim 8, further comprising:
 interpreting a change in the bearer capability; and
 writing the interpreted change into the stored information when the terminal is connected to the application server.

14. A method in accordance with claim 8, wherein identifying the relevant bearer capability from the retrieved information comprises detecting a type of bearer that the terminal uses based on the retrieved information, and attaching the information representative of the relevant bearer capability of the access bearer to the header of the information request comprises attachment of information representative of the type of bearer to the header of the information request.

15. A method of operating a terminal in a wireless communication system, said terminal adapted to be wirelessly connected to at least one access device, each of said at least one access device arranged to provide wireless access over a type of access bearer, the terminal comprising a controller and memory, the method comprising:
 initiating, by the controller, an information request to be sent to an application server, wherein a header of the information request comprises information representative of a relevant bearer capability of an access bearer used for conveying communication between the terminal and the at least one access device;
 transmitting the information request, with the header, to the application server via the access bearer; and
 receiving requested information from the application server in response to the information request, the requested information being tailored depending on the information representative of the relevant bearer capability of the access bearer used for conveying communication between the terminal and the at least one access device.

16. A method in accordance with claim 15, wherein the information request is one of a WAP request or an HTTP request.

17. The method of claim 15, wherein the information about the bearer capability includes parameters regarding the transmission speed used by the access bearer used for conveying the information request.

18. A method in accordance with claim 15, further comprising detecting a type of bearer that the terminal uses based on the information about the bearer capability, wherein the information representative of the relevant bearer capability of the access bearer is information representative of the type of bearer.

19. A method in accordance with claim 15, further comprising storing, in the memory, information about the access bearer used by the terminal.

20. A method in accordance with claim 19, further comprising:
 retrieving, from the memory, information about the bearer capability of the access bearer used by the terminal; and
 identifying the relevant bearer capability from the retrieved information.

* * * * *